US012020885B2

(12) United States Patent
Mathae

(10) Patent No.: US 12,020,885 B2
(45) Date of Patent: Jun. 25, 2024

(54) ON-LOAD TAP CHANGER

(71) Applicant: Hitachi Energy Ltd, Zürich (CH)

(72) Inventor: Jean Louis Gérard Mathae, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/034,404

(22) PCT Filed: Nov. 10, 2021

(86) PCT No.: PCT/EP2021/081235
§ 371 (c)(1),
(2) Date: Apr. 28, 2023

(87) PCT Pub. No.: WO2022/101262
PCT Pub. Date: May 19, 2022

(65) Prior Publication Data
US 2023/0317380 A1 Oct. 5, 2023

(30) Foreign Application Priority Data
Nov. 13, 2020 (EP) .................................... 20207471

(51) Int. Cl.
*H01F 27/29* (2006.01)
*H01F 27/02* (2006.01)
(Continued)

(52) U.S. Cl.
CPC ........... *H01H 9/0016* (2013.01); *H01F 27/02* (2013.01); *H01F 27/29* (2013.01); *H01F 27/321* (2013.01); *H01H 9/0044* (2013.01)

(58) Field of Classification Search
CPC .... H01H 9/0016; H01H 9/0044; H01H 9/005; H01F 27/02; H01F 27/29; H01F 27/321; H01F 27/04; H01F 29/02; H01F 29/025
See application file for complete search history.

(56) References Cited

U.S. PATENT DOCUMENTS 3,211,956 A * 10/1965 Dornbush .............. H02H 7/055 361/128
2005/0099741 A1* 5/2005 Stenestam ............ G01R 31/333 361/1
(Continued)

FOREIGN PATENT DOCUMENTS

CN 111312502 A 6/2020
CN 111900000 A 11/2020
(Continued)

OTHER PUBLICATIONS

International Search Report and Written Opinion of the International Searching Authority, PCT/EP2021/081235, mailed Feb. 11, 2022, 12 pages.
(Continued)

*Primary Examiner* — Mang Tin Bik Lian
(74) *Attorney, Agent, or Firm* — Sage Patent Group

(57) ABSTRACT

The present invention relates to an On-Load Tap Changer (OLTC) for connection to a regulating winding of a transformer, the regulating winding enclosed in a transformer tank, wherein the transformer tank includes insulating liquid, the OLTC comprising: a switching device including: a main contact, and a resistor contact, wherein the main contact and the resistor contact are configured to be arranged directly in the insulating liquid and that they are configured to be physically separated from the insulating liquid, and wherein the main contact is enclosed in a main contact enclosure and the resistor contact is enclosed in a resistor contact enclosure. The present invention further relates to a transformer comprising the OLTC as disclosed herein.

20 Claims, 2 Drawing Sheets

(51) Int. Cl.
*H01F 27/32* (2006.01)
*H01H 9/00* (2006.01)

(56) References Cited

U.S. PATENT DOCUMENTS

| | | | | |
|---|---|---|---|---|
| 2011/0031220 | A1* | 2/2011 | Nilsson | H01H 9/0038 218/118 |
| 2011/0063064 | A1* | 3/2011 | Albrecht | H01F 27/14 336/150 |
| 2012/0112730 | A1 | 5/2012 | Brueckl et al. | |
| 2016/0189859 | A1* | 6/2016 | Larsson | H01F 41/02 29/602.1 |
| 2016/0211089 | A1* | 7/2016 | Kaltenborn | H01H 9/0038 |
| 2016/0293325 | A1* | 10/2016 | Kirchner | H01F 29/04 |
| 2017/0236658 | A1* | 8/2017 | Zerr | H01H 9/0038 336/150 |
| 2017/0271098 | A1* | 9/2017 | Pankofer | H01F 29/04 |

FOREIGN PATENT DOCUMENTS

| | | | |
|---|---|---|---|
| DE | 102014112764 | A1 | 3/2016 |
| GB | 2457079 | A | 8/2009 |
| WO | 2014108244 | A1 | 7/2014 |
| WO | 2015044331 | A1 | 4/2015 |

OTHER PUBLICATIONS

International Preliminary Report on Patentability, PCT/EP2021/081235, mailed Nov. 15, 2022, 11 pages.

Examination Report for IN Patent Application No. 202347031717, mailed Dec. 8, 2023, 6 pages.

First Office Action for Chinese Patent Application No. 202180074885.8, mailed Sep. 23, 2023, 4 pages.

Search Report for Chinese Patent Application No. 202180074885.8, mailed Sep. 23, 2023, 2 pages.

* cited by examiner

ON-LOAD TAP CHANGER

CROSS REFERENCE TO RELATED APPLICATIONS

This application is a 35 U.S.C. § 371 national stage application of PCT International Application No. PCT/EP2021/081235 filed on Nov. 10, 2021, which in turn claims foreign priority to European Application No. 20207471.2, filed on Nov. 13, 2020, the disclosures and content of which are incorporated by reference herein in their entirety.

TECHNICAL FIELD

The present invention relates to an On-Load Tap Changer (OLTC) for connection to a regulating winding of a transformer. The present invention further relates to a transformer comprising an OLTC as disclosed herein.

BACKGROUND OF THE INVENTION

Electromagnetic induction devices such as power transformers may be provided with On-Load Tap Changers (OLTC) for enabling stepped voltage regulation of the electromagnetic device as a means for voltage compensation when the electromagnetic induction device is On-Load, i.e. connected to a transmission or distribution network. The OLTC:s changes the turn ratio between the windings in a transformer and are used for controlling the output voltage of a transformer by providing the possibility to switch in or switch out additional turns in a transformer winding. This is essential for the stabilization of network voltage under variable load conditions.

An OLTC comprises a set of fixed contacts which are connectable to a number of taps of a regulating winding of a transformer, where the taps are located at different positions in the regulating winding. By switching in or out the different taps, the effective number of turns of the transformer can be increased or decreased, thus regulating the output voltage of the transformer.

Tap changers are either on-load, i.e. operating while the transformer is energized, or off-load. A tap changer generally comprises a number of switches for tap changing and a number of resistors or other impedances to prevent short-circuiting. The tap changer is typically filled with an insulating liquid, such as oil, which besides insulation offers cooling of the device.

An OLTC may be connected to a winding of a transformer in a transformer tank. The OLTC occupy quite much space and is also expensive. This has an influence on the size and cost of the transformer.

SUMMARY OF THE DISCLOSURE

It is an object of the present disclosure to alleviate at least the problems discussed above.

It is an object of the present disclosure to reduce the size of an OLTC.

Further, it is an object of the present disclosure to reduce the size and footprint of electromagnetic induction devices such as power transformers.

Further, it is an object of the present disclosure to reduce the cost of an OLTC.

The present disclosure relates to an On-Load Tap Changer (OLTC) for connection to a regulating winding of a transformer, the regulating winding enclosed in a transformer tank, wherein the transformer tank comprises insulating liquid, the OLTC comprising:

a switching device comprising:

a main contact, and a resistor contact, wherein the main contact and the resistor contact are configured to be arranged directly in the insulating liquid and that they are configured to be physically separated from the insulating liquid. The main contact may be enclosed in a main contact enclosure and the resistor contact may be enclosed in a resistor contact enclosure. A compact OLTC will be possible to obtain and this may also reduce the size of a transformer tank when the OLTC is arranged in a transformer tank. Further, the cost may be reduced with the OLTC of the present disclosure. The main contact enclosure and the resistor contact enclosure will limit any soot or gas formed during operation.

The main contact enclosure and the resistor contact enclosure may be configured to be in direct contact with the insulating liquid.

The main contact enclosure and resistor contact enclosure may be separate enclosures.

The main contact enclosure and resistor contact enclosure may be physically separated from each other.

The main contact enclosure may be under vacuum, may comprise insulating liquid or may comprise inert gas in the main contact enclosure. The vacuum reduces the risk for arcing. The insulating liquid is electrically insulating and also has a cooling effect. The insulating inert gas has the advantages that it may reduce the risk for arcing.

Further, the resistor contact enclosure may be under vacuum, may comprise insulating liquid or may comprise inert gas in the resistor contact enclosure. This is advantageous in the same manner as above for main contact enclosures.

The OLTC may further comprise a pre-selector contact configured to be arranged directly in the insulating liquid and configured to be physically separated from the insulating liquid.

The pre-selector contact may be enclosed in a pre-selector contact enclosure.

Further, the pre-selector contact enclosure may be under vacuum, may comprise insulating liquid or may comprise insulating gas in the pre-selector contact enclosure.

The resistor contact enclosure may be configured to be in direct contact with the insulating liquid.

When referring to the contact enclosure it relates to the main contact enclosure, resistor contact enclosure and pre-selector enclosure. The insulating liquid of the contact enclosure may be mineral oil or ester. Mineral oil and ester have good properties for insulating and have good properties to withstand arcing from contacts.

The inert gas of the contact enclosure may be SF6 (sulfur hexafluoride). SF6 is a good electrical insulator and suppresses arc.

Alternatively the inert gas of the contact enclosure may be a gas mixture comprising fluoroketone (C5-PFK), carbon dioxide ($CO_2$) and oxygen ($O_2$).

Alternatively the inert gas of the contact enclosure may be a gas mixture comprising fluoroketone (C5-PFK), Nitrogen ($N_2$) and oxygen ($O_2$).

The switching device may further comprise one or more vacuum interrupters.

The switching device may be a diverter switch or a selector switch.

The OLTC may be used in power transformers from 1 megavoltampere (MVA) and above.

The OLTC may be an OLTC with high step voltage 2 kV-10 kV.

The present disclosure further relates to a transformer comprising an OLTC as disclosed herein. A more compact and a cheaper transformer arrangement can be achieved with the present disclosure.

The transformer may be a High Voltage transformer, also known as power transformers. By high voltage is meant a voltage above 145 kilovolt (kV).

Further, the transformer may comprise a regulating winding arranged in a transformer tank with insulating liquid, wherein the main contact and the resistor contact are arranged directly in the insulating liquid in the main tank. Further, a pre-selector contact may be arranged directly in the insulating liquid in the transformer tank.

The main contact and the resistor contact may be arranged on an insulating carrier arrangement which is fixed in the transformer tank. Further, a pre-selector contact may be arranged on an insulating carrier arrangement which is fixed in the transformer tank.

BRIEF DESCRIPTION OF THE DRAWINGS

FIG. 5 discloses an example of an electrical circuit comprising a pre-selector contact which could be used in the some embodiments.

FIG. 6 discloses a side view of a schematic insulating carrier arrangement for carrying the main contact, the resistor contact and possibly a pre-selector contact.

FIG. 7 discloses schematically an enclosure for a main contact, a resistor contact or a pre-selector contact.

DETAILED DESCRIPTION

An OLTC is used in transformers for varying turn ratios to be selected in steps. The OLTC is connected to a number of locations, so called taps, at the primary or the secondary winding.

OLTC may adjust the turn ratio during operation. Further, OLTC is a tap changer which is used in applications where a supply interruption during a tap change is unacceptable.

An OLTC includes a tap selector which allows for stepped voltage regulation of the output. The tap selector is also called fine selector.

When referring to electrical switch elements in this application, it refers to main contact, resistor contact or pre-selector contact.

Figure 1:
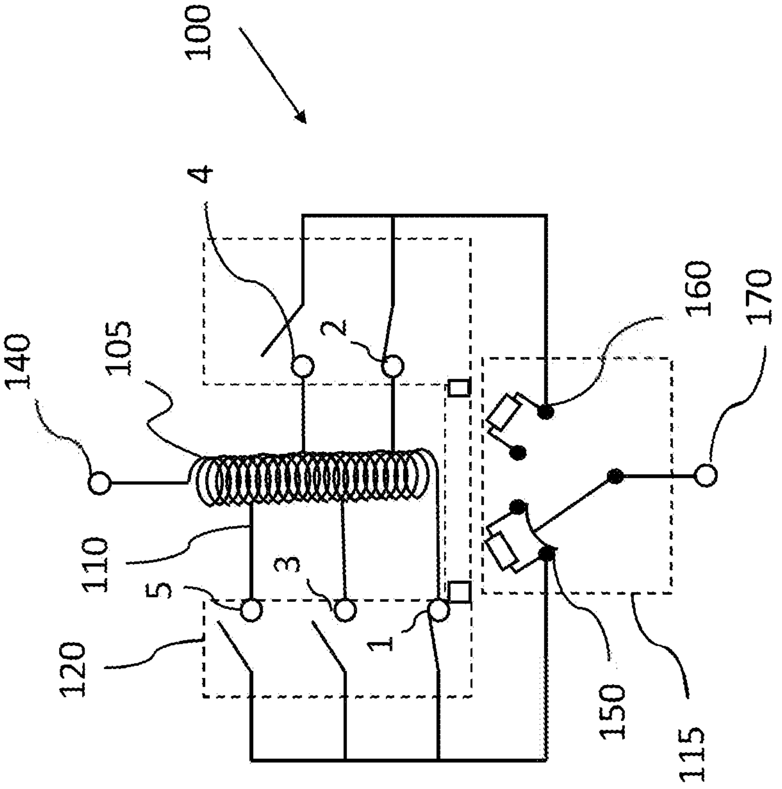
Fig. 1 PRIOR ART
FIG. 1 discloses schematically an OLTC.

FIG. 1 schematically illustrates an example of a common OLTC 100 of prior art which is connected to a regulating winding 105 having a set of different taps 110. The OLTC of FIG. 1 comprises a switching device 115 and a fine selector 120. The fine selector 120 comprises contacts 1 to 5 which are connected to the taps 110 where each contact is arranged to be connected to one of the taps 110 of the regulating winding 105. The fine selector 120 is framed with dashed lines to schematically show the fine selector. The switching device 115 comprises electrical switch elements. The switching device 115 is in FIG. 1 is framed with a dashed square to schematically show the switching device 115.

The regulating winding 105 has a set of taps 110, which are shown to be connected to the contacts 1-5 of the tap changer 100. One end of the regulating winding 105 is provided with an external contact 140 and the other end is connected to the OLTC 100 via connectors 150 and 160. Depending on which tap 110 is currently connected to a contact 1-5 the electrical path between the external contact 140 and an external contact 170 of the OLTC via connection 150, or between 140 and 170 via connection 160 will include a different number of the regulating winding turns. The regulating winding 105 is often not seen as part of the tap changer 100.

When changing from one tap to another, main contacts, resistor contacts and vacuum interrupters are to be closed and opened, respectively in a certain sequence.

This allows the contacts 1, 3 or 5 to switch over to 2 or 4. The switching device 115 makes it possible for e.g. 1 to be switched to e.g. 2 in the fine selector 120.

The electrical switch elements in the switching device or in the OLTC arc during operation. Today used OLTC electrical switch elements in the form of contacts break in liquid or gas. The arcing takes place in the same medium as is used as the insulating medium and causes a degradation of the medium. Soot, particles or gas may be formed which will pollute the medium. The switching device and its electrical switch elements are arranged in a compartment separate from the transformer tank in order to avoid pollution of the surrounding insulating liquid of the transformer tank. The compartment is liquid tight and electrically insulating.

When the transformer is in use, arcing will occur when tapping connections are changed. There may be some arcing from the electrical switch elements. Arcing from the electrical switch elements pollutes the insulating liquid which they may come in contact with. It is very important to keep the insulating liquid of the transformer tank clean and therefore, the switching device is enclosed in a separate compartment. Such a compartment needs to insulate electrically and also isolate the compartment so that no insulating liquid is leaking out from the compartment as used in regular OLTC solution of prior art. We refer to FIG. 3 which discloses a transformer 301. An OLTC 300 of prior art is arranged in a transformer tank 310. The OLTC includes a switching device 330 and a fine selector 320. The switching device 330 and the fine selector 320 are schematically disclosed as dashed squares. The drawing is a cross section from above. Schematically one regulating winding 305 is disclosed in the figure but without any detailed disclosure. Further, an electromagnetically core 306 is schematically illustrated in the figure. However, one to three regulating windings and electromagnetically cores may be used in a transformer. The compartment 340 of the switching device 330 may have walls 390 of for example steel. The compartment 340 includes the walls 390, a wall or barrier 360 of an insulating and liquid tight material, sealings 370, and a part of the transformer tank wall 312 will be part of the compartment. A wall or barrier 360 of an electrically insulating and liquid tight material is needed between the switching device 330 and the fine selector 320. Further, the compartment walls may comprise the insulating and liquid tight material. The material used for the insulating part of the compartment is expensive and the compartment also includes sealing material 370 which is expensive. The insulating material has an epsilon value which is not good for the electrical fields and may result in a large size of the OLTC. Sealing elements 370 are also used in order to avoid any leakage. Further, it is an extensive work to mount the sealing elements 370. The parts of the compartment 340 to be in contact with the sealing elements 370 need to have a clean and smooth surface against the sealing elements. Further, dirty insulating liquid which may be oil 350 will be contained in the electrical switch compartment 340 while the transformer tank 310 will comprise clean insulating liquid 315 or transformer oil. The dielectric properties of the dirty and the clean insulating liquid are different and this difference may dimension the OLTC up. The dirty or polluted insulating liquid will have reduced and impaired dielectric properties. This requests a larger distance between the diverter switch and the transformer tank wall.

The inventor has now found a way to reduce the size of an OLTC.

Figure 4:
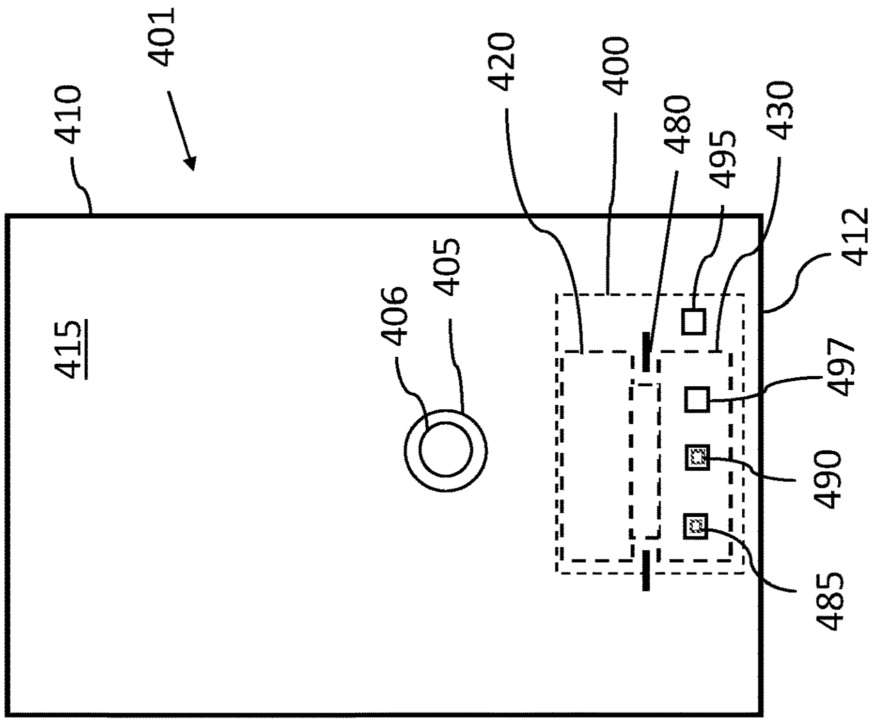
FIG. 4 disclose a transformer tank comprising an OLTC according to the some embodiments.

FIG. 4 shows an OLTC 400 according to the present disclosure arranged in a transformer tank 410. Schematically one regulating winding 405 is disclosed in the figure without showing any connection to other parts. Further, an electromagnetically core 406 is schematically illustrated in the figure. One to three regulating windings and electromagnetically cores may be used in a transformer. The drawing shows a cross section from above. The drawing is schematic.

The present disclosure provides an On-Load Tap Changer (OLTC) 400 for connection to a regulating winding 405 of a transformer 401, the regulating winding 405 enclosed in a transformer tank 410, wherein the transformer tank comprises insulating liquid 415, the OLTC comprising:

a switching device 430 comprising:

a main contact 485, and a resistor contact 490, wherein the main contact 485 and the resistor contact 490 are configured to be arranged directly in the insulating liquid 415 and that they are configured to be physically separated from the insulating liquid 415.

The OLTC 400 is illustrated with a dashed square in which the switching device 430 and the fine selector 420 are included. In the figure also the fine selector 420 is disclosed in the square of the OLTC 400.

By the expression "arranged directly in the insulating liquid" as used herein is meant that the main contact and the resistor contact are not provided in a separate compartment in the transformer tank which comprises another fluid, typically dirty oil or dirty insulating liquid as mentioned herein. In other words, the main contact 485 and the resistor contact 490 are configured to be provided directly in the transformer tank 410, i.e. a main tank, comprising the regulating winding 405 and the insulating liquid 415. This also applies for a possible pre-selector contact 495.

FIG. 4 also discloses some electrical switch elements provided in the schematic illustration of a switching device 430. The switching device may comprise a main contact 485, resistor contact 490 for example. Some further elements 497 may also be provided in the switching device 430. Such elements may be a vacuum interrupter or a resistor unit for example. The OLTC may comprise a pre-selector contact 495. The pre-selector contact 495 is comprised in the OLTC.

The electrical switch elements, i.e the main contact 485, the resistor contact 490 and the pre-selector contact 495, are thus configured to be in contact with the insulating liquid 415. The electrical switch elements are configured to not pollute the insulating liquid 415. Further, the electrical switch elements are configured to be physically separated or isolated from the insulating liquid 415. By the expression "the electrical switch elements are configured to be physically separated from the insulating liquid" is meant that the contacts are separated or isolated from the insulating liquid, for example in a separate enclosure. An OLTC compartment or compartment for the switching device will then not be needed. The OLTC may be considered to be an OLTC without a separate compartment.

Figure 2:
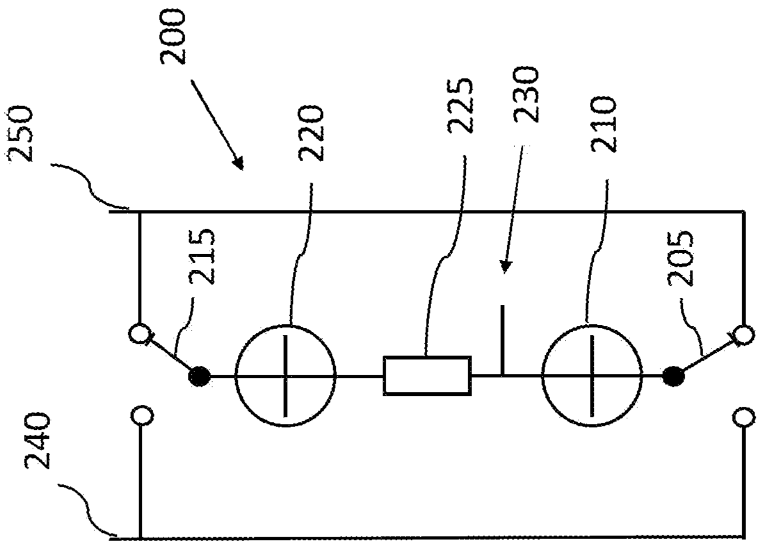
FIG. 2 discloses an example of an electrical circuit of a switching device which can be used in some embodiments.

In FIG. 2 an example of a switching device 200 is disclosed. The switching device 200 is a diverter switch 200 and is only an example of a diverter switch which may be used in some embodiments. FIG. 2 will be further described below, but in the following reference is also made to FIG. 2.

The main contact 205 may be enclosed in a main contact enclosure, the resistor contact 215 may be enclosed in a resistor contact enclosure. The main contact enclosure and resistor contact enclosure may be separate enclosures. The main contact enclosure and resistor contact enclosure may be physically separated from each other. When the main contact and the resistor contact are enclosed in a main contact enclosure and a resistor contact enclosure the arcing is limited by the enclosure and will not pollute the insulating liquid of the transformer tank.

Further, it is also referred to FIG. 7. FIG. 7 schematically shows an enclosure 700 for any of a main contact, a resistor contact or a pre-selector contact 710 (the same reference number for all of them). The contact 710 switches between two contact elements 715, 720. The contact elements 715, 720 are connected to contact elements 725, 735 outside the enclosure 700 via leads 740, 745. The main contact 710 may be enclosed in a main contact enclosure 700 and the resistor contact 710 may be enclosed in a resistor contact enclosure 700. Further, a pre-selector contact 710 may be enclosed in a pre-selector contact enclosure 700. There is a further contact element 750 in connection with the main contact, resistor contact or the pre-selector contact 710, which contact element 750 is connected to a contact element 760 situated outside the contact enclosure 700.

The main contact enclosure 700 may be under vacuum, may comprise insulating liquid or may comprise inert gas.

In the same manner the resistor contact enclosure 700 may use vacuum, may comprise insulating liquid or may comprise inert gas.

In the same manner the pre-selector contact enclosure 700 may use vacuum, may comprise insulating liquid or may comprise inert gas.

To be under vacuum is meant a pressure below 0.015 mbar.

The contacts may be a single breaker or a double breaker.

The contact enclosures may be made of an electrically insulating material. The enclosure may be made of ceramics or plastic material for example.

With the new solution an OLTC compartment or a switching device compartment is not needed. By this the OLTC will be smaller in size, i.e. have a smaller footprint and thereby also a smaller transformer may be obtained. This is a large save for the user of transformers.

The today used OLTC:s having a compartment is isolated from the insulating liquid by compartment material of a metal, an insulating material and a sealing material. The insulating material may be a plate between the OLTC chamber and the transformer tank, or the whole enclosure wall of the compartment of the OLTC may be made of the insulating material. The material may be for example plastic, fibre reinforced plastic or ceramics.

A comparison will be illustrated with the solution according to the present disclosure compared to the technique when the switching device is enclosed in a separate compartment.

Figure 3:
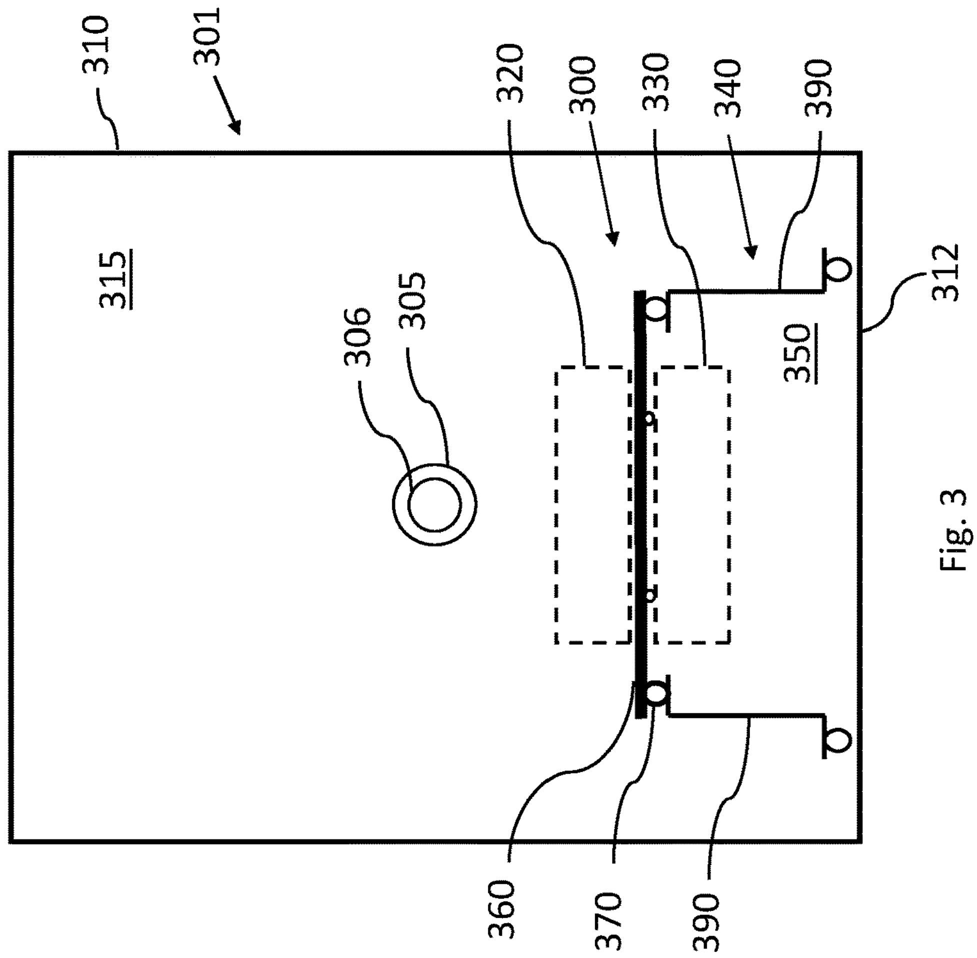
FIG. 3 discloses a transformer tank comprising an OLTC according to prior art.

FIG. 3 shows an OLTC 300 arranged in a transformer tank 310. The OLTC 300 in this example is arranged at one end of the transformer tank 310. The fine selector 320 is arranged next to the switching device 330 to be in contact with the taps of the winding of the regulating winding while the switching device 330 is arranged in a separate compartment 340. In the switching device 330 are the main contact and the resistor contact arranged but this is not shown in FIG. 3. In the separate compartment 340 the electrical switch elements will arc during operation and the oil in the separate switch element compartment will get polluted and dirty. The dielectric properties of the clean transformer oil 315 and the dielectric properties of the the dirty oil 350 of the compartment will differ. This will have an influence on the electrical field of the OLTC and a distance between the OLTC and the transformer wall 312 is needed for avoiding flash over due to different electrical potentials. The wall/barrier 360 between the switching device 330 and the fine selector 320 is made of an electrical insulating material and further functions as a liquid barrier to hinder any dirty oil to leak out from the switching device compartment 340 to the transformer tank 310. The material of the wall/barrier 360 has a different epsilon value than the oil, which affects the electrical field. During the lifetime of the OLTC arcing electrical switch elements may be needed to be exchanged due to the wear and breaking down of the material. When service and repairing of the OLTC is needed the switching device compartment 340 need to be emptied. It is desired to not empty the transformer tank 310 at this moment. Emptying a transformer tank is very extensive work and time consuming. When the switching device compartment 340 is emptied, the transformer oil 315 of the transformer tank 310 will apply a high pressure on the switching device compartment 340 and on the wall/barrier 360. Therefore the wall/barrier 360 will need to have a quite large thickness to withstand the pressure. Thus, the wall/barrier 360 with the different epsilon value versus the surrounding will have a negative impact on the electric fields in the transformer tank 310. Thus, the wall/barrier 360 in the OLTC in FIG. 3 will be quite large. This also has an effect on the transformer tank size.

Sealings 370 are also needed for the separate compartment 340 of the switching device 330. It is very important that the polluted and dirty oil will not leak out into the transformer oil. The sealing elements 370 are quite expensive. In addition, the components closest to the sealing elements 370 need to be smooth and without sharp edges against the sealing elements and it is time demanding to make clean and smooth surfaces for the sealing elements and assembling of the sealings.

Such problems are solved with the present disclosure.

It is now referred to FIG. 4. In FIG. 4 is an OLTC 400 according to the present disclosure shown wherein the electrical switch elements, such as the main contact 485, resistor contact 490 and possibly a pre-selector contact 495, are configured to be arranged directly in the insulating liquid. There is no separate compartment for the switching device 430. Next to the switching device is the fine selector 420 arranged. There is direct contact between main contact 485, the resistor contact 490, the pre-selector contact 495 and the insulating liquid 415. No wall/barrier is needed and no compartment for the switching device is needed. However, there is an insulation carrier arrangement 480 carrying the electrical switch elements of the OLTC, but this carrying arrangement 480 is less material demanding compared to the prior art wall/barriers. The material volume may be about 20% compared to the prior art solution comprising a wall/barrier in FIG. 3. This further leads to reduction of the need of electrical shielding of the OLTC due to the influence on electric field will be reduced and it is possible to arrange the OLTC 400 closer to the transformer tank wall 412. In addition the insulating carrier arrangement 480 which carry the electrical switch elements may then be shorter, i.e. not extending in the breadth of the transformer tank as much as the OLTC is extending in the prior art transformer tank as shown in FIG. 3. This is in comparison between the wall/barrier in prior art and the insulating carrier which may be used in the present disclosure. This is because the electrical switch elements may be placed closer to each other compared to the prior art construction shown in FIG. 3. Further, no sealing elements are needed. The sealing material is expensive and may involve extensive work to adapt the parts of the compartment which need to have a clean and smooth surface against which the sealing material will be arranged.

The clean insulating liquid of the transformer tank will have better dielectric properties than the polluted insulating liquid of the switching device. Therefore, the distance needed between the electrical switch elements in the prior art technique wherein the electrical switch elements will pollute the insulating liquid in the switch device compartment will need a larger distance between them compared to the present disclosure.

The OLTC may be arranged on insulating carrier arrangement 480 for carrying the electrical switch elements. Such an insulating carrier arrangement 480 may also carry other parts in the OLTC. In the solution according to the present disclosure, when the electrical switch elements are configured to be arranged directly in the insulating liquid, the insulating carrier arrangement will not need as much material as used in prior art OLTC:s. The insulating carrier arrangement 480 will weigh less, such as about 20% of the weight of an insulating carrier or wall/barrier used in an OLTC comprising a compartment. In prior art solutions, the insulating carrier is usually a part of the insulating barrier. The reduction of the insulating material in the insulating carrier arrangement is an advantage obtained by the present solution of the disclosure. The material is expensive and also influences the electrical fields around the OLTC which in turn increases the need of a larger distance to the transformer tank walls.

The OLTC of the present disclosure has many advantages when the electrical switch elements are arranged directly in the insulating liquid. As can be seen the transformer tank in FIG. 4 is less wide and it is shorter than the transformer tank in FIG. 3, which is schematically disclosed. This is due to the effects given by the electrical switch elements arranged directly in the insulating liquid without a separate switching device compartment. For example, when the electrical switch elements are provided in a separate switching device compartment, the electrical switch elements will need to be located with more space between them compared to when the insulating carrier 480 is used according to the present disclosure.

The main contact 485 and the resistor contact 490 are configured to be arranged directly in the insulating liquid 415 of a transformer tank 410. Further, the main contact enclosure and the resistor contact enclosure may be configured to be arranged directly in the insulating liquid. This means that the main contact 485 and the resistor contact 490 are arranged directly in the insulating liquid 415 in the transformer tank 410. Further, the OLTC may comprise a pre-selector contact 495. The pre-selector contact may also be arranged directly in the insulating liquid 415 in the transformer tank 410. Further, the pre-selector contact enclosure may be configured to be arranged directly in the insulating liquid in the transformer tank.

The main contact, the resistor contact and possibly the pre-selector contact may be arranged on a carrier arrangement of insulating material. A schematic insulating carrier arrangement 600 is shown in FIG. 6. The carrier arrangement 600 includes two rods 605, 610 of insulating material. The two rods are connected to each other by a transverse fixation device 640 and a transverse flange 645 for connecting the rods 605, 610 to each other. Plates 625, 630, 635 are arranged in the insulating carrier arrangement 600. The main contact 685 and the resistor contact 690 are arranged on the carrier arrangement 600 by attaching them to the arrangement for example on a plate 625, 630, 635 of the arrangement 600 which is located between the rods 605, 610. The main contact 685, the resistor contact 690 and the pre-selector contact 695 may for example be screwed or glued to a plate 625, 630, 635. The plate may be made of an insulating material. The plate material can be the same material as the insulating carrier material or the plate material may be another material. Examples of plate material is a polymeric material, fibre reinforced polymer material or ceramic. The main contact 685, the resistor contact 690 and the pre-selector contact 695 may be attached to a plate 625, 630, 635 of the carrier arrangement 600. The carrier arrangement 600 is arranged and fixed in the transformer tank by the fixation device 640 and the flange 645. In the lower end of the carrier arrangement 600 the fixation device 640 is arranged. The fixation device 640 is connected to the insulation rods 605, 610 and is fixed to the bottom part of the transformer tank. In the upper part of the carrier arrangement 600 is a flange 645 connected to the rods 605, 610 and fixed to the top part of the transformer tank. In this way the main contact 685, the resistor contact 690 and possibly a pre-selector contact 695 may be arranged in the transformer tank and are in direct contact with the insulation liquid. FIG. 6 shows one OLTC for a transformer with three phases. The main contact 685, the resistor contact 690 and the pre-selector contact 695 have the same reference number in all plates 625, 630, 635 in the Figure.

The main contact 685 and the resistor contact 690 are arranged on an insulating carrier arrangement 600. Further, the pre-selector contact 695 may be arranged on the insulating carrier arrangement 600. The main contact 685 and the resistor contact 690 are attached to the carrier arrangement 600, and possibly the pre-selector contact 695 is attached to the carrier arrangement 600. The contacts may be attached to plates as disclosed above. The carrier arrangement 600 is fixed in the transformer tank via the fixation device 640 and a flange 645. The carrier arrangement 600 may be fixed to the transformer walls for example, such as the bottom wall and the top wall.

The pre-selector contact 695 may be arranged in the same location as the main contact 685 and the resistor contact 690. However, electrically the pre-selector contact is not included in the diverter switch.

Dirty liquid has inferior insulation properties compared to clean insulating liquid. The difference in dielectric and insulation properties between dirty and clean insulating liquid is quite large and dimensions the OLTC up.

The new kind of electrical switch elements will have a longer life and will not be needed to be exchanged as often as the prior used electrical switch elements. Thus, with the solution obtained in the present disclosure an OLTC requiring no or reduced maintenance is obtained.

Pre-selector contacts are used in OLTC to enable connection or disconnecting turns of the transformer winding. Pre-selector contacts may also be used to connect a whole part of a winding. In the contacts of the pre-selector, arcing may also occur when the contacts are moved.

Preselector contacts are used in OLTC:s which are used in plus/minus transformers and in coarse/fine transformers. The OLTC of the present disclosure may be connected to a regulating winding of a plus/minus transformer or a coarse/fine transformer.

The OLTC may comprise a pre-selector contact 495 configured to be arranged directly in the insulating liquid 415 wherein the pre-selector contact 495 is configured to be physically separated from the insulating liquid 415 of the transformer. The pre-selector contact may be configured to be isolated from the insulating liquid 415.

The pre-selector contact 710 may be enclosed in a pre-selector contact enclosure 700.

The pre-selector contact enclosure may be under vacuum, may comprise insulating liquid or may comprise insulating gas in the pre-selector contact enclosure.

The insulating liquid of the contact enclosure for any of main contact, resistor contact or pre-selector contact may be mineral oil or ester.

The inert gas of the contact enclosure may be SF6. SF6 is advantageous when it relates to reduce arcing and it has good electrical insulating effect.

The switching device may be a diverter switch or a selector switch. A diverter switch has been illustrated in FIG. 2. A diverter switch may be configured in many different ways. However, the diverter switch according to the present disclosure comprise electrical switch elements as disclosed herein and those are configured in the way as disclosed herein. The selector switch also comprises electrical switch elements as disclosed herein, such as main contacts, resistor contacts and possibly pre-selector contacts.

The switching device may be a diverter switch. An example of an electrical circuit of a diverter switch 200 is shown in FIG. 2. A diverter switch 200 may have many different constructions. The diverter switch in FIG. 2 comprises a main contact 205, a vacuum interrupter 210, a resistor unit 225, a vacuum interrupter 220 and a resistor contact 215 in series. Connections 240 and 250 are connected to the fine selector of the OLTC and the diverter switch is connected to an external contact 230. According to the present disclosure the electrical switch elements are configured to be physically separated from insulating liquid of the transformer tank. By switching the main contacts 205 and resistor contacts 215 in a conventional manner, one or the other of the contacts 1-5 (FIG. 1) will be in electrical contact with the external contact 230, and thus provide an electrical path through the tap changer. The diverter switch 200 of FIG. 2 is an example only, and any suitable type of diverter switch 200 can be used. However, the electrical switch elements, such as the main contact 205 or the resistor contact 215 comprised in the diverter switch are configured according to the present disclosure. Further, the pre-selector contact included in the OLTC is also configured according to the present disclosure.

The OLTC may comprise a pre-selector contact configured to be arranged directly in the insulating liquid and are configured to be physically separated from the insulating liquid. In FIG. 5 is an example of an electrical circuit comprising a pre-selector contact disclosed. An electrical circuit 500 including a pre-selector contact 545 is shown in FIG. 5. A main contact 505, a vacuum interrupter 510, a resistor unit 525, a vacuum interrupter 520 and a resistor contact 515 are connected in series as disclosed in FIG. 5. The diverter switch 535, framed with a dashed square in FIG. 5, is connected to a regulating winding 540 and to an external contact 530. The pre-selector contact 545 is connected to the other side of the regulating winding 540. Further, the pre-selector contact 545 is connected to a second regulating winding 550. In FIG. 5 is also a fine selector shown with taps and contacts. Those are similar to the fine selector as disclosed in FIG. 1 and are not further described here.

The present disclosure further provides a transformer comprising an OLTC as disclosed herein.

The transformer 401 comprises a transformer tank 410 comprising a regulating winding 405, insulating liquid 415 of the transformer tank 410, and an OLTC 400 as disclosed herein.

Further, the transformer may comprise a regulating winding 405 arranged in a transformer tank 410 with insulating liquid 415, wherein the main contact 485 and the resistor contact 490 are arranged directly in the insulating liquid in the main tank.

The main contact and the resistor contact may be arranged on an insulating carrier arrangement which is fixed in the transformer tank. Further, a pre-selector contact may be arranged on the insulating carrier arrangement.

The OLTC comprises a switching device comprising electrical switch elements. The electrical switch elements comprise a main contact, a resistor contact, possibly a pre-selector contact and possibly one or more vacuum interrupters. The main contact, resistor contact, pre-selector contact and the vacuum interrupter are arranged directly in the insulating liquid and they are physically separated from the insulating liquid. The main contact, the resistor contact and the vacuum interrupter are arranged directly in the insulating liquid. Further, more than one main contact and more than one resistor contact may be comprised in the OLTC as disclosed herein.

The main contact is enclosed in a main contact enclosure and the resistor contact is enclosed in a resistor contact enclosure. The pre-selector contact is enclosed in a pre-selector contact enclosure. The electrical switch elements are physically separated from the insulating liquid. The transformer comprises an OLTC wherein the OLTC have no separate compartment. The switching device thus have no separate liquid tight and insulating compartment but the electrical switch elements are provided directly in the insulating liquid.

An OLTC may be provided for each phase winding. A transformer may have one to three phase windings.

The invention claimed is:

1. An On-Load Tap Changer (OLTC) for connection to a regulating winding of a transformer, the regulating winding enclosed in a transformer tank, the transformer tank comprising insulating liquid, the OLTC comprising:

a diverter switch comprising:

a main contact, and a resistor contact, the main contact and the resistor contact configured to be arranged directly in the insulating liquid and configured to be physically separated from the insulating liquid, the main contact enclosed in a main contact enclosure, and the resistor contact enclosed in a resistor contact enclosure separate from the main contact enclosure.

2. The OLTC according to claim 1, wherein the main contact enclosure and the resistor contact enclosure are configured to be in direct contact with the insulating liquid.

3. The OLTC according to claim 1, wherein the main contact enclosure is under vacuum.

4. The OLTC according to claim 1, wherein the resistor contact enclosure is under vacuum.

5. The OLTC according to 1, the OLTC further comprising a pre-selector contact configured to be arranged directly in the insulating liquid and configured to be physically separated from the insulating liquid.

6. The OLTC according to claim 5, wherein the pre-selector contact is enclosed in a pre-selector contact enclosure.

7. The OLTC according to claim 6, wherein the pre-selector contact enclosure is under vacuum.

8. The OLTC according to claim 6, wherein the pre-selector contact enclosure comprises insulating liquid.

9. The OLTC according to claim 6, wherein the pre-selector contact enclosure comprises insulating gas in the pre-selector contact enclosure.

10. The OLTC according to claim 1, wherein the insulating liquid of the contact enclosure is mineral oil.

11. The OLTC according to claim 1, wherein the switching device further comprises one or more vacuum interrupters.

12. A transformer comprising an OLTC according to claim 1.

13. The transformer according to claim 12 wherein the transformer is a HV transformer.

14. The transformer according to claim 12, further comprising a regulating winding arranged in a transformer tank with insulating liquid, wherein the main contact, the resistor contact and a pre-selector contact are arranged directly in the insulating liquid in the transformer tank.

15. The transformer according to claim 12, wherein the main contact and the resistor contact is arranged on an insulating carrier arrangement which is fixed in the transformer tank.

16. The OLTC according to claim 1, wherein the main contact enclosure comprises insulating liquid.

17. The OLTC according to claim 1, wherein the main contact enclosure comprises inert gas in the main contact enclosure.

18. The OLTC according to claim 1, wherein the resistor contact enclosure comprises insulating liquid.

19. The OLTC according to claim 1, wherein the resistor contact enclosure comprises inert gas in the resistor contact enclosure.

20. A transformer comprising:

a transformer tank;

insulating liquid disposed in the transformer tank;

a regulating winding enclosed in the transformer tank; and an On-Load Tap Changer (OLTC) connected to the regulating winding, the OLTC comprising:

a diverter switch comprising:

a main contact enclosure arranged directly in the insulating liquid;

a main contact enclosed in the main contact enclosure to arrange the main contact directly in the insulating liquid and physically separated from the insulating liquid, and a resistor contact enclosure separate from the main contact enclosure, the resistor contact enclosure arranged directly in the insulating liquid; and a resistor contact enclosed in the resistor contact enclosure to arrange the resistor contact directly in the insulating liquid and physically separated from the insulating liquid.

* * * * *